US005403428A

United States Patent [19]

Shingo et al.

[11] Patent Number: 5,403,428

[45] Date of Patent: Apr. 4, 1995

[54] APPARATUS FOR PRODUCING COMMUNICATION ARTICLES INCLUDING POSTCARDS AND ENVELOPES

[75] Inventors: Hiromichi Shingo, Yokohama; Yukio Sasayama, Tokyo; Itaru Murakami, Yokohama; Yukio Kii, Osaka; Eiji Yonekura, Kawasaki, all of Japan

[73] Assignee: Toyo Shokuhin Kikai Kabushiki Kaisha, Kanagawa, Japan

[21] Appl. No.: 774,807

[22] Filed: Oct. 11, 1991

[30] Foreign Application Priority Data

Oct. 12, 1990 [JP] Japan .................................. 2-274520

[51] Int. Cl.[6] .............................................. B32B 31/04

[52] U.S. Cl. ................................. 156/442.1; 156/459; 156/467; 156/477.1; 156/202; 156/204; 493/189; 493/194; 493/217; 493/227; 493/234; 493/381; 83/510; 83/658

[58] Field of Search ...................... 156/201, 204, 379.8, 156/442.1, 459, 467, 477.1, 277, 196, 199, 202; 493/217, 222, 243, 248, 251, 254, 257-260, 381-383, 386, 390, 189, 194, 227, 234, 235, 343-345, 349, 353; 83/658, 510

[56] References Cited

U.S. PATENT DOCUMENTS

| | | | |
|---|---|---|---|
| 2,347,439 | 4/1944 | Shea et al. | 493/194 |
| 2,405,598 | 8/1946 | Miller | 83/659 |
| 2,888,860 | 6/1959 | Baumgartner | 493/373 |
| 3,133,479 | 5/1962 | Franklin | 493/239 |
| 3,956,049 | 5/1976 | Johnsen | 156/204 |
| 4,019,937 | 4/1977 | Holson | 156/204 |
| 4,063,641 | 12/1977 | Kuehn et al. | 156/204 |
| 4,769,969 | 9/1988 | Minami | 493/381 |
| 4,913,693 | 4/1990 | Ball et al. | 493/381 |
| 4,922,690 | 5/1990 | Güsewell et al. | 83/658 |

FOREIGN PATENT DOCUMENTS

| | | | |
|---|---|---|---|
| 0051099 | 5/1982 | European Pat. Off. | 493/227 |
| 2106556 | 4/1990 | Japan . | |
| 962485 | 7/1964 | United Kingdom | 156/204 |

*Primary Examiner*—Caleb Weston
*Attorney, Agent, or Firm*—Birch, Stewart, Kolasch & Birch

[57] ABSTRACT

The present invention relates to a method and apparatus for producing communication articles such as postcards, envelopes or the like in each of which display surfaces for information or the like are separably bonded with a synthetic resin therebetween by heating for concealing information such as correspondence or a printed display medium and then mailing it. It is an object of the invention to enable easy and smooth separating of a film-containing sheet and accurate insertion of a film in a sheet.

In order to achieve the object, a continuous sheet having a plurality of communication article-forming sheets which are connected in series is folded in at least two, a continuous film is inserted between the sheet portions into which the continuous sheet is folded to form a film-containing continuous sheet which is then heated and pressed to that the sheet portions of the continuous sheet are bonded with the film therebetween, and the film-containing continuous sheet is then separated into the respective communication article-forming sheets by hitting the positions between the respective communication article-forming sheets of the continuous sheet while pulling the film-containing continuous sheet to produce communication articles.

3 Claims, 18 Drawing Sheets

APPARATUS FOR PRODUCING COMMUNICATION ARTICLES INCLUDING POSTCARDS AND ENVELOPES

BACKGROUND OF THE INVENTION

1. Field of the Invention

The present invention relates to a method and apparatus for producing communication articles such as postcards, envelopes or the like. Particularly, the present invention relates to a method and apparatus for producing communication articles such as postcards, envelopes or the like in which display surfaces for information or the like are separably bonded by heating them through a synthetic resin film or the like in order to conceal information such as correspondence or a print display medium, and then mail it.

2. Description of the Related Art

An example of prior art related to a method and apparatus for producing such communication articles is the invention disclosed in Japanese Patent Laid-Open No. 2-106556.

In the invention disclosed in this publication, information is printed on a predetermined portion of both upper and lower sheets, and an intermediate sheet having portions at both sides thereof which permit both sheets to be separably bonded is then interposed between both sheets during the process of putting the sheets one on top the other so that both sheets are separably bonded with the adhesive intermediate sheet therebetween to form one product.

A continuous sheet is used for both the upper and lower sheets and is cut to each sheet's predetermined size after the upper and lower sheets are bonded with the intermediate sheet therebetween to produce a communication article such as postcards or the like.

However, in the above invention, since the work of cutting the continuous sheets with the film therebetween to each sheet's predetermined size is carried out by employing the tensile force produced by a difference between the transfer velocities of two rolls, the upper and lower sheets can each be cut, but the intermediate sheet made of a synthetic resin film cannot be smoothly cut even if perforations are provided therein. Since the intermediate sheet made of a synthetic film cannot be smoothly cut, therefore, there is the possibility of an error in the operation occurring. Even if no error occurs, there is the problem that an unnecessary portion of the film will be protrude from the upper and lower sheets due to the distortion produced at the edge of the cut intermediate sheet.

Further, in the above-mentioned apparatus, one continuous sheet is cut by a cutter into sheet portions which are used as the upper and lower sheets, and the intermediate sheet is then interposed between the upper and lower sheets. Thus the position of the intermediate sheet interposed between the two sheets is easily deviated. This results in the danger of producing defective products.

SUMMARY OF THE INVENTION

The present invention has been achieved to solve the above problems, and it is an object of the present invention to provide a method and apparatus for producing communication articles such as postcards, envelopes or the like which are capable of easily and smoothly cutting sheets with a film therebetween and accurately interposing the film between the sheets.

To this end, the present invention provides a method of producing communication articles such as postcards, envelopes or the like in which a sheet for forming a communication article such as a postcard, envelope or the like is formed so that it can be folded at least once, and a synthetic resin film is interposed between sheet portions into which the sheet for forming a communication article is folded so that the two sheet portions are separably bonded with the film therebetween, the method comprising folding at least double a continuous sheet having a plurality of sheets for forming communication articles which are connected in series while conveying the continuous sheet, interposing a continuous film between the sheet portions into which the sheet is folded to form a film-containing continuous sheet, heating the film-containing continuous sheet, pressing the film-containing continuous sheet so as to bond the sheet portions of the continuous sheet with the film therebetween, and then hitting the portions between the respective sheets for forming communication articles of the continuous sheet while pulling the film-containing continuous sheet so as to separate the continuous sheet into the sheets for forming communication articles.

The present invention also provides an apparatus for producing communication articles such as postcards, envelopes or the like in which a sheet for forming communication articles such as postcards, envelopes or the like is formed so that it can be folded into at least two, and a synthetic resin film is interposed between the sheet portions into which the sheet for forming communication articles is folded so that the two sheet portions are separably bonded with the film therebetween, the apparatus comprising a folding device for folding a continuous sheet having a plurality of communication article-forming sheets which are connected in series into at least two while conveying the continuous sheet, a film inserting device for inserting a continuous film between the sheet portions into which the continuous sheet is folded by the folding device to form a film-containing continuous sheet, a heating device for heating the film-containing continuous sheet having the film inserted therebetween by the film inserting device, a press device for pressing the film-containing continuous sheet which is heated by the heating device so as to bond the sheet portions of the continuous sheet with the film therebetween, and a separating device for separating the continuous sheet into the communication article-forming sheets by hitting the portions between the respective communication article-forming sheets while pulling the film-containing continuous sheet.

In the present invention configured as described above, the continuous sheet is first folded into at least two portions, the film is inserted between the portions to form a film-containing sheet which is then heated and pressed so that the sheet portions with the film therebetween are bonded, and the film-containing sheet is then separated into the respective communication article-forming sheets by hitting the portions between the respective communication article-forming sheets while pulling the film-containing continuous sheet to continuously and automatically produce communication articles.

As described above, since the continuous sheet is folded into at least two sheet portions, and the film is interposed between the two sheet portions, the film can be accurately interposed between the sheet portions into which the continuous sheet is folded, without producing any positional deviation.

In addition, since the film-containing continuous sheet having the sheet portions which are heated and bonded with the film therebetween is separated into the communication article-forming sheets by hitting the portions between the respective communication article-forming sheets while pulling the film-containing continuous sheet, the sheet is easily and accurately separated.

Further, the method of separating the film-containing continuous sheet into the communication article-forming sheets by hitting the sheet produces no distortion at the edge of the film cut.

These and other objects, features and advantages of the present invention will become clear when reference is made to the following description of the preferred embodiments of the present invention, together with reference to the accompanying drawings.

DETAILED DESCRIPTION OF PREFERRED EMBODIMENTS

A postcard producing apparatus in an embodiment of the present invention is described below with reference to the drawings.

Figure 1:
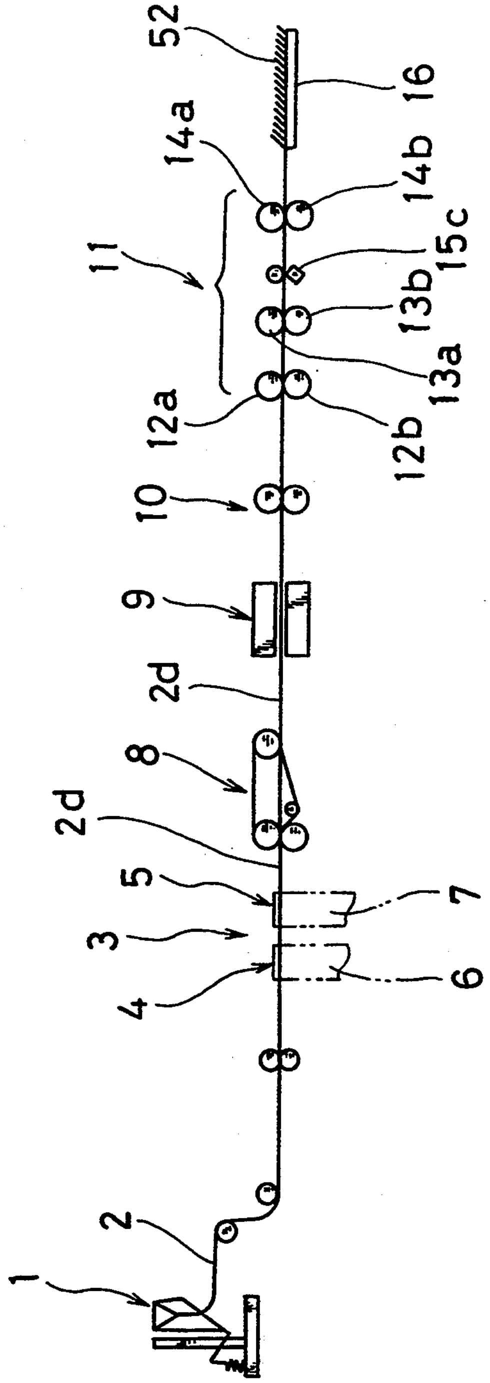
FIG. 1 is a schematic front view of the whole of an apparatus for producing postcards.

FIG. 1 is a schematic front view of the whole postcard producing apparatus. The arrangement of the whole apparatus is outlined below.

In FIG. 1, reference numeral 1 denotes a folding device for folding, in three, a continuous sheet 2 used for producing postcards, and reference numeral 3 denotes a film inserting device for inserting synthetic resin films 6, 7 into the folded continuous sheet 2. The film inserting device 3 is provided with two guide means 4, 5 for guiding the films to the portions between the sheet portions of the folded continuous sheet 2. Reference numeral 8 denotes an edge cutting device for cutting the edges 37 of the continuous sheet 2. Reference numeral 9 denotes a heating device for heating a film-containing continuous sheet 2*d* having the films 6, 7 which are inserted therein, reference numeral 10 denotes press rollers for pressing the film-containing continuous sheet 2*d* which is heated by the heating device 9 so as to bond the films to the continuous sheet 2. Reference numeral 11 denotes a separating device for separating the film-containing continuous sheet 2*d*. The separating device 11 comprises first rollers 12*a*, 12*b*, second rollers 13*a*, 13*b* both of which are rotated at the same speed as that of the first rollers 12*a*, 12*b*, third rollers 14*a*, 14*b* both of which are rotated at a speed higher than that of the first and second rollers 12*a*, 12*b*, 13*a*, 13*b*, and shock blocks 15*c* for hitting the film-containing continuous sheet 2*d* so as to separate the sheet 2*d*. Reference numeral 16 denotes a discharge conveyor for forwardly conveying the produced postcards which are piled.

A description is now made of the arrangement of each of the devices of the postcard producing apparatus. The arrangement of the folding device 1 is first described below with reference to FIG. 2.

Figure 2A:
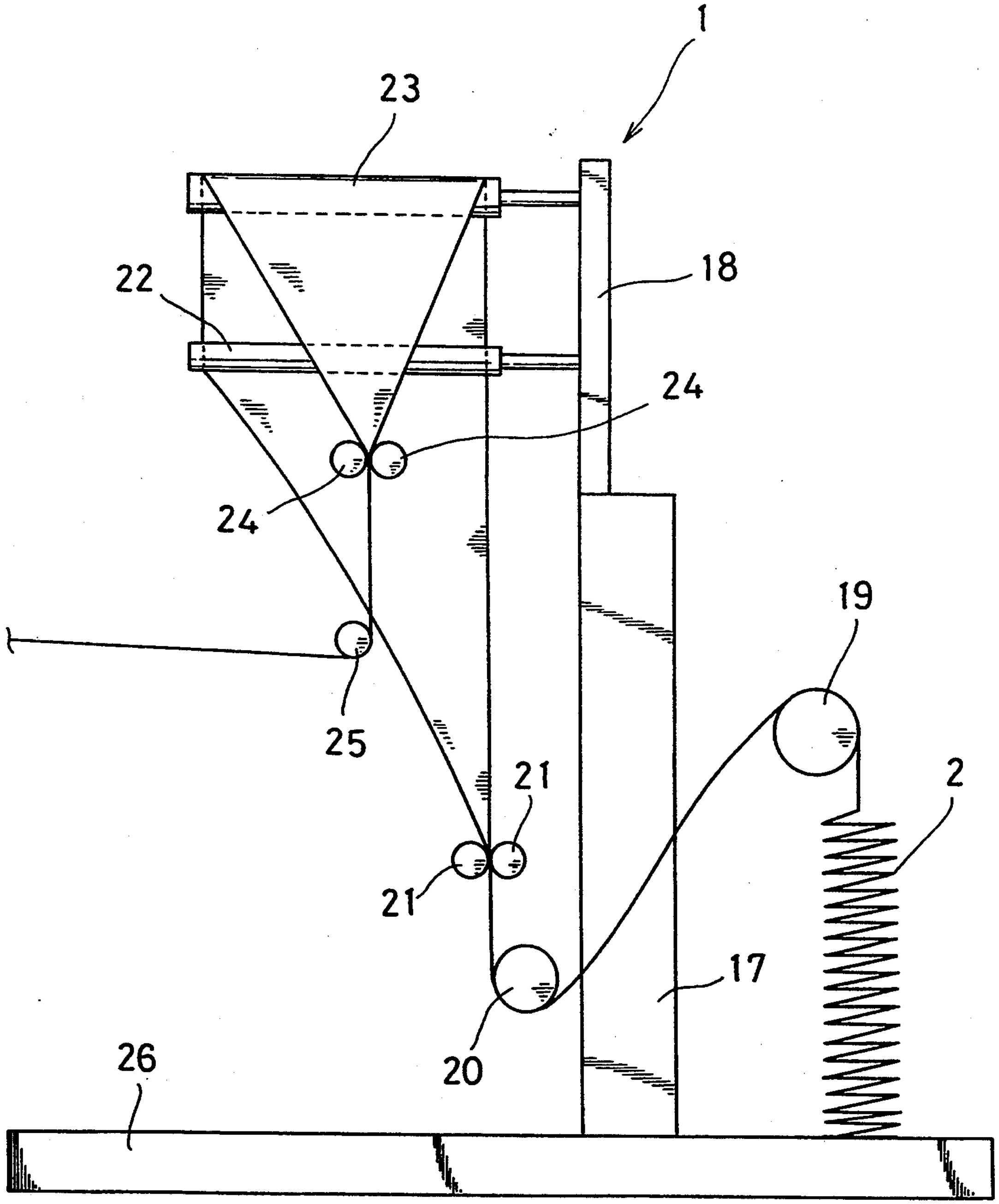
FIG. 2(*a*) is a schematic front view of a folding device, and FIG. 2(*b*) is a schematic side view of the same.
Figure 2B:
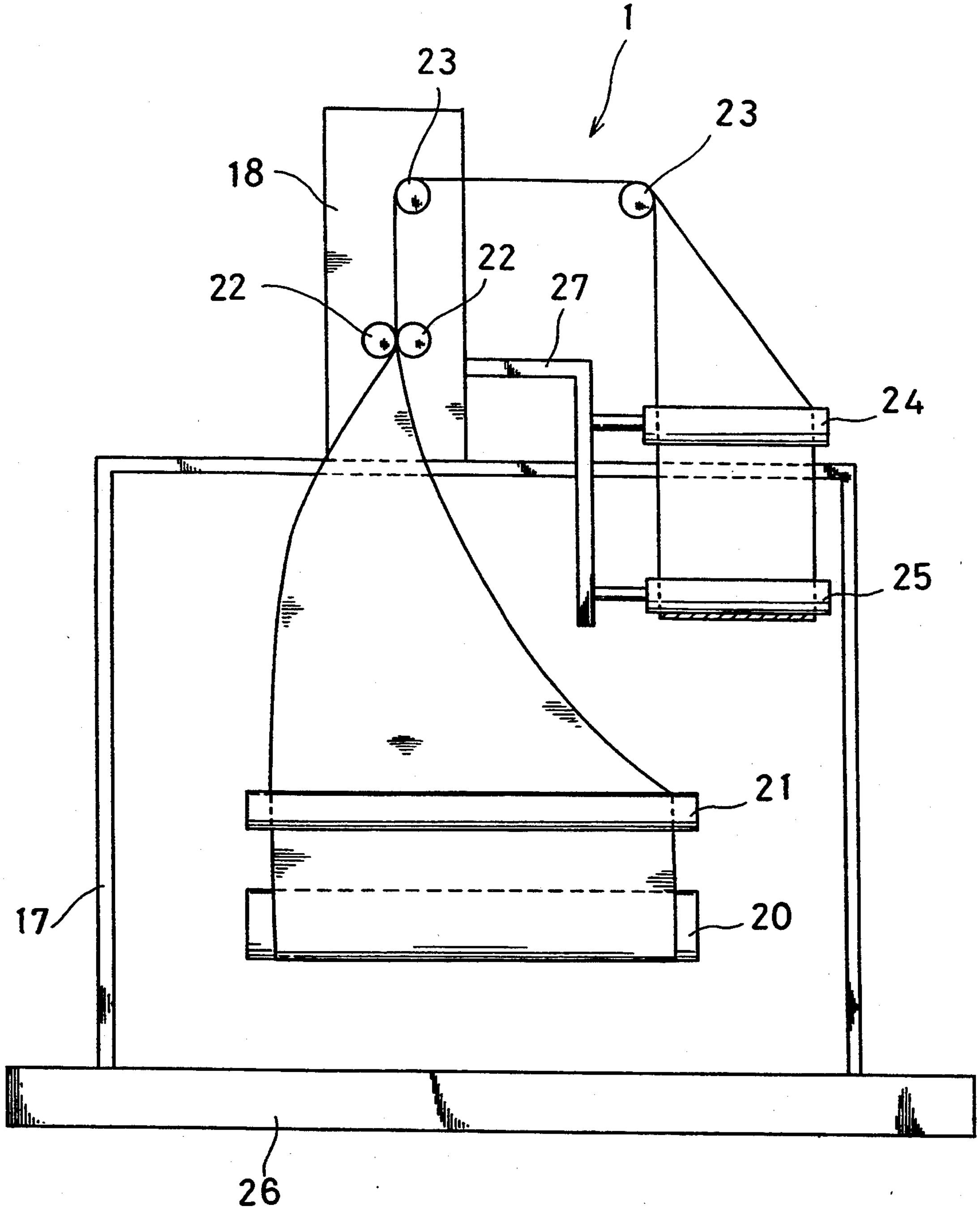

In FIG. 2, reference numeral 26 denotes the base of the folding device, a frame 17 being erectly provided on the base 26, and a support plate 18 being provided on the upper portion of the frame Reference numeral 19 denotes a conveying roll for conveying the folded continuous sheet 2; reference numeral 20 is a bottom roll for upwardly transferring the continuous sheet 2 which is downwardly conveyed by the conveying roll 19; and reference numeral 21 denotes folding starting rods which are provided slightly above the bottom roll 20. Reference numeral 22 denotes a double folding rod for folding the continuous sheet 2 in two after folding has been started by the folding starting rods 21, and reference numeral 23 denotes an upper roll which is provided slightly above the double folding rod 22, the upper roll 23 and the double folding rod 22 being rotatably supported by the support plate 18. Reference numeral 22 denotes treble folding rods for folding, in three, the continuous sheet 2 which is transferred by the upper roll 23, a direction changing roll 25 being provided below the treble folding rods 22. The treble folding rods 22 and the direction changing rod 25 are rotatably supported by the L-shaped plate 27 provided on a side of the support plate 18.

In FIG. 2, although each of the rods and rolls other than the double folding rod 22, the upper roll 23, the treble folding rods 24 and the direction changing roll 25 is also rotatably supported, the detailed structure of the rods and rolls is not shown in the drawing.

The arrangement of the film inserting device 3 is described below with reference to FIG. 3.

Figure 3A:
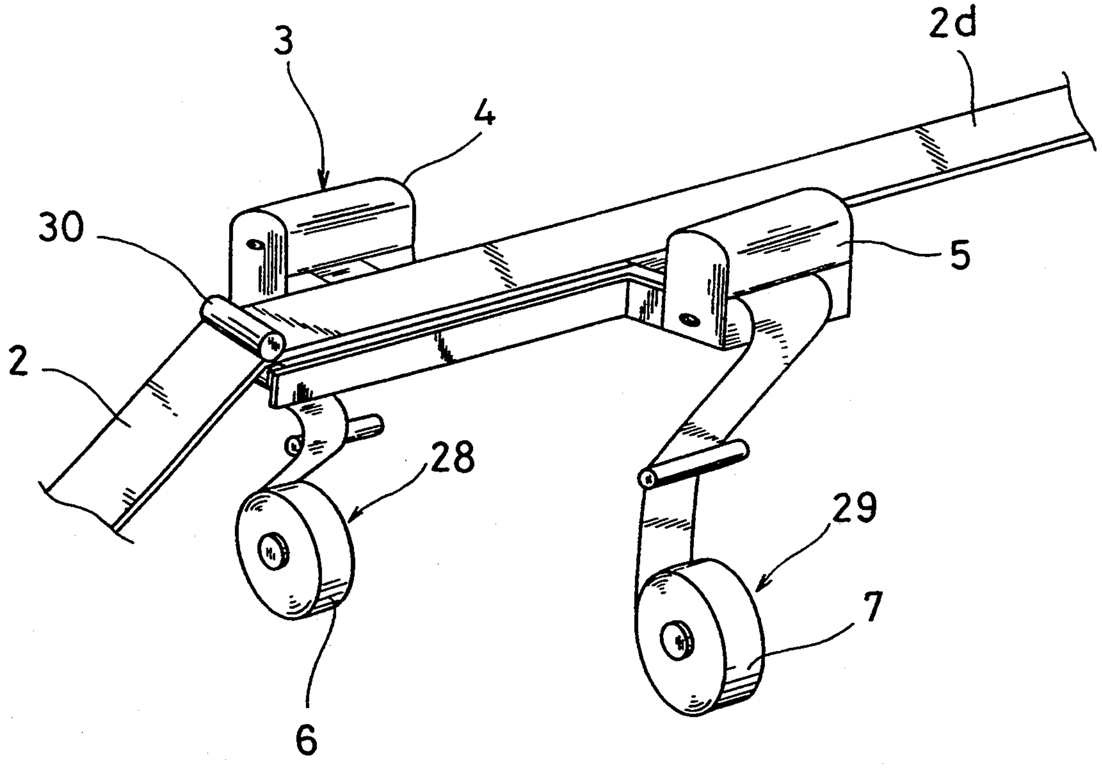
FIG. 3(*a*) is a perspective view of a principal portion of a film inserting device, and FIG. 3(*b*) is a schematic plan view showing the direction of transfer of a film when the film is inserted into the sheet portions into which a continuous sheet is folded.
Figure 3B:
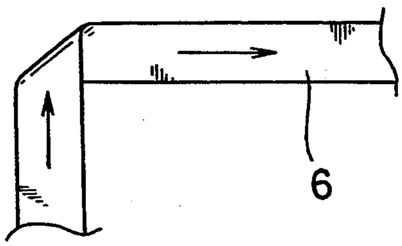

In FIG. 3(*a*), reference numeral 28 denotes a roll on which one film 6 to be inserted is wound, and reference numeral 29 denotes a roll on which the other film 7 is wound.

Reference numerals 4, 5 denote guide means for guiding the films supplied from the rolls 28, 29, respectively, into the continuous sheet 2.

Reference numeral 30 denotes a guide roller for conveying the continuous sheet supplied from the folding device 1 to the side of the guide means 4, 5.

Figure 4A:
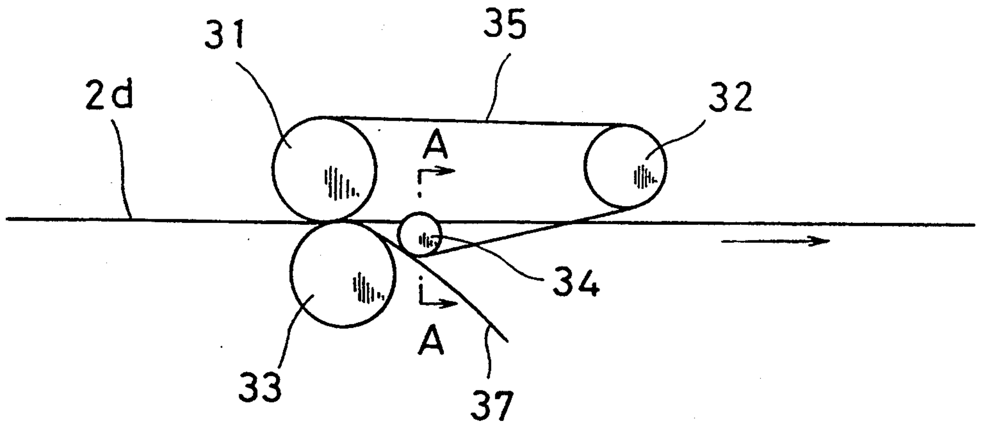
FIG. 4(*a*) is a schematic front view of an edge cutting device, FIG. 4(*b*) is an enlarged sectional view taken along the line A—A in FIG. 4(*a*), and FIG. 4(*c*) is a schematic perspective view of the same.
Figure 4B:
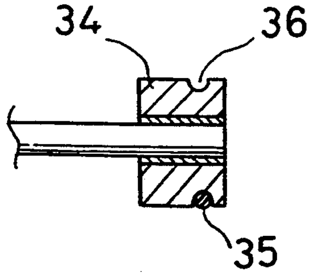
Figure 4C:
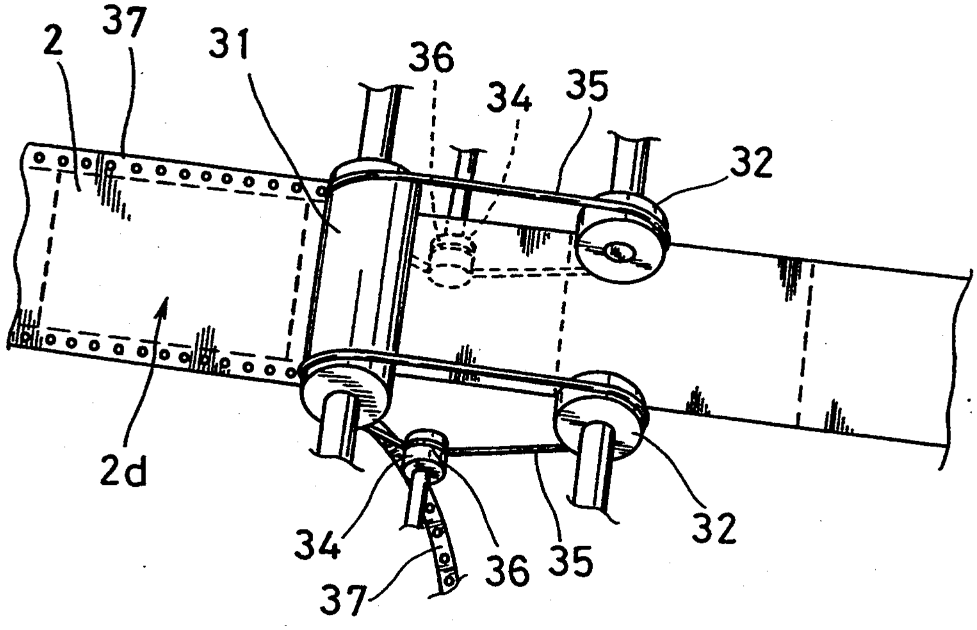

The arrangement of the edge cutting device 8 is described below with reference to FIG. 4.

In FIG. 2, reference numeral 31 denotes a first roller, and reference numeral 32 denotes second rollers which are provided at a distance from the first roller 31 on the same plane as the first roller 31. Reference numeral 33 denotes a third roller which is provided below the first roller 31 for holding the continuous sheet 2 between the first and third rollers 31, 33, and reference numeral 32 denotes edge cutting rollers provided at a position below the first and second rollers 31, 32 between them for cutting the edges of the continuous sheet 2. A round belt 35 is wound around the first roller 31, each of the second rollers 32 and each of the edge cutting rollers 32.

Each of the edge cutting rollers 32 has a groove 36 formed therein so that the round belt 35 is inserted into the groove 36.

The arrangement of the heating device 9 is described below with reference to FIG. 5.

Figure 5:
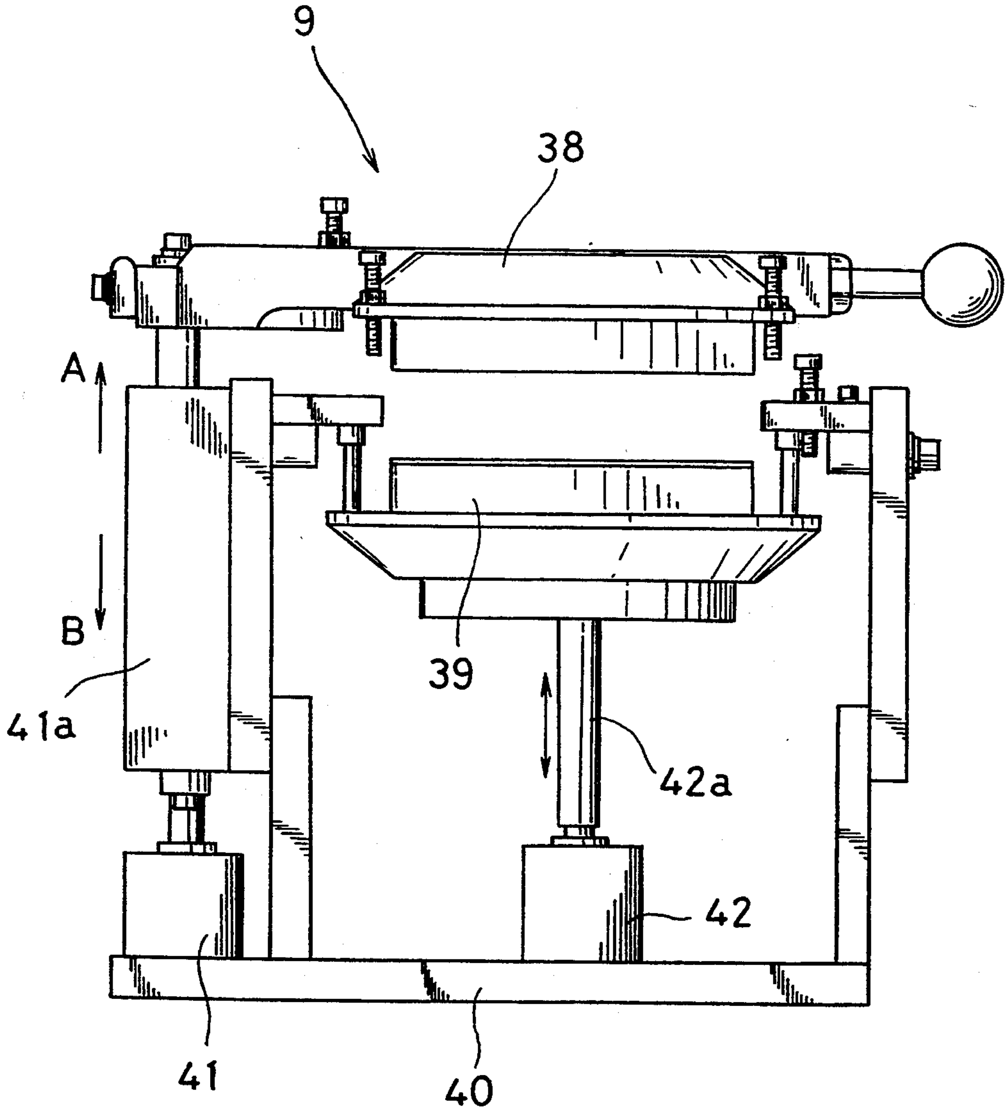
FIG. 5 is a schematic side view of a heating device.

In FIG. 5, reference numeral 38 denotes an upper heater, and reference numeral 39 denotes a lower heater. The upper heater 38 is provided on a base 20 through an air cylinder 41 and a rod 41*a* so that it can be moved upward and downward. The lower heater 39 is provided on the base 40 through an air cylinder 42 and a rod 42*a* so that it can be moved upward and downward.

The arrangement of the press rollers is described below with reference to FIG. 6.

Figure 6:
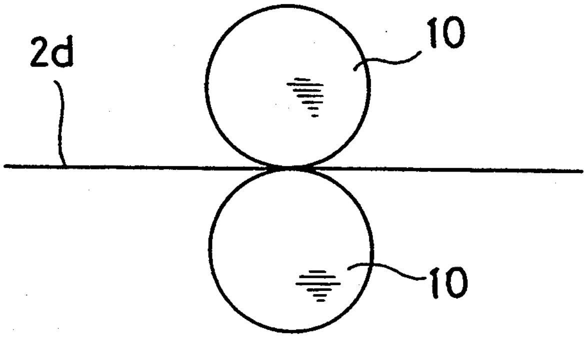
FIG. 6 is a schematic front view of press rolls.
Figure 7A:
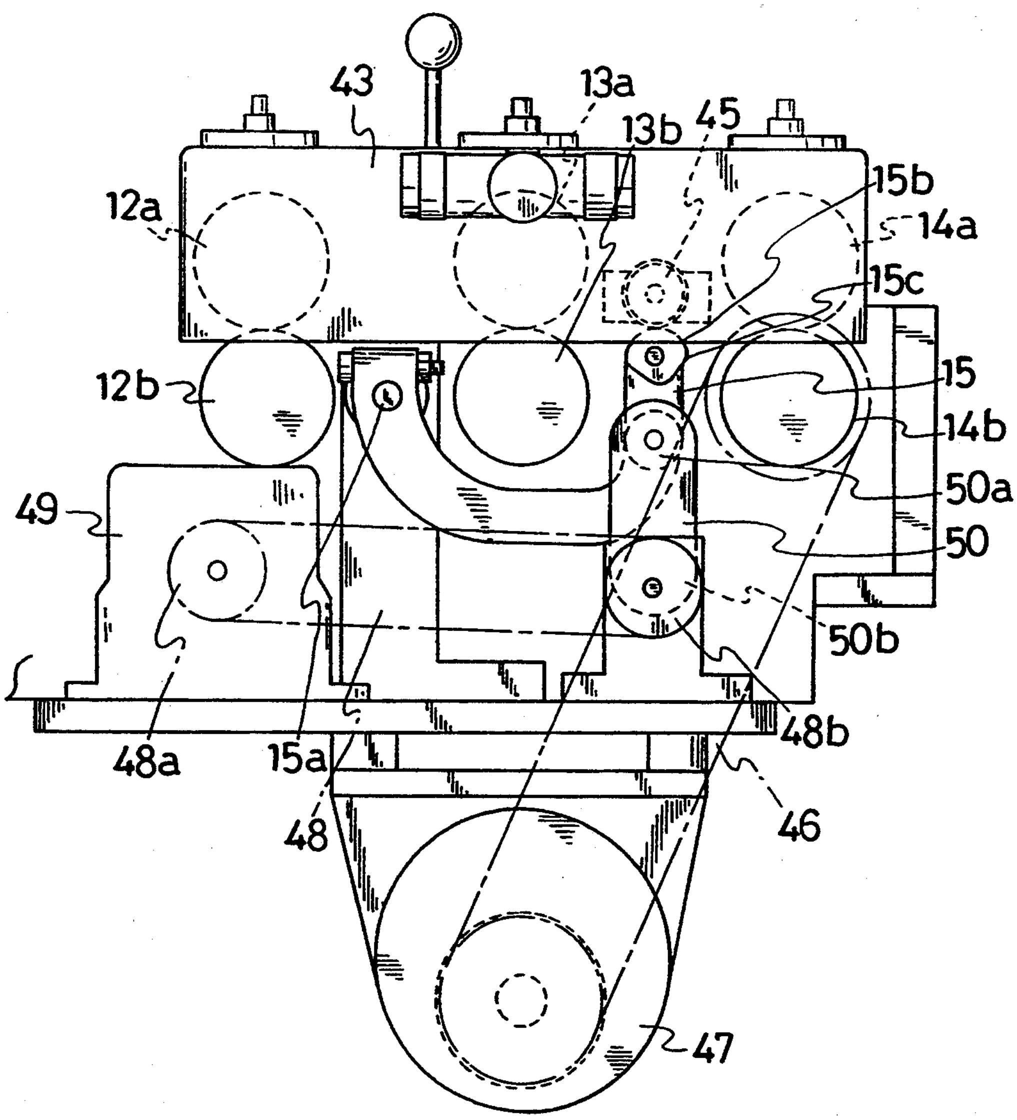
FIG. 7(*a*) is a schematic front view of a separating device, FIG. 7(*b*) is a schematic plan view of the same showing the state where upper rollers are disposed, FIG. 7(*c*) is a schematic plan view of the same showing the state where lower rollers are disposed, FIG. 7(*d*) is a partially sectional schematic side view showing a linkage mechanism comprising shock blocks, a vibration rod, a connecting plate and so on, FIG. 7(*e*) is a schematic plan view showing a linkage mechanism comprising a vibration rod and a connecting plate, and FIG. 7(*f*) is a front view of the shock blocks.
Figure 7B:
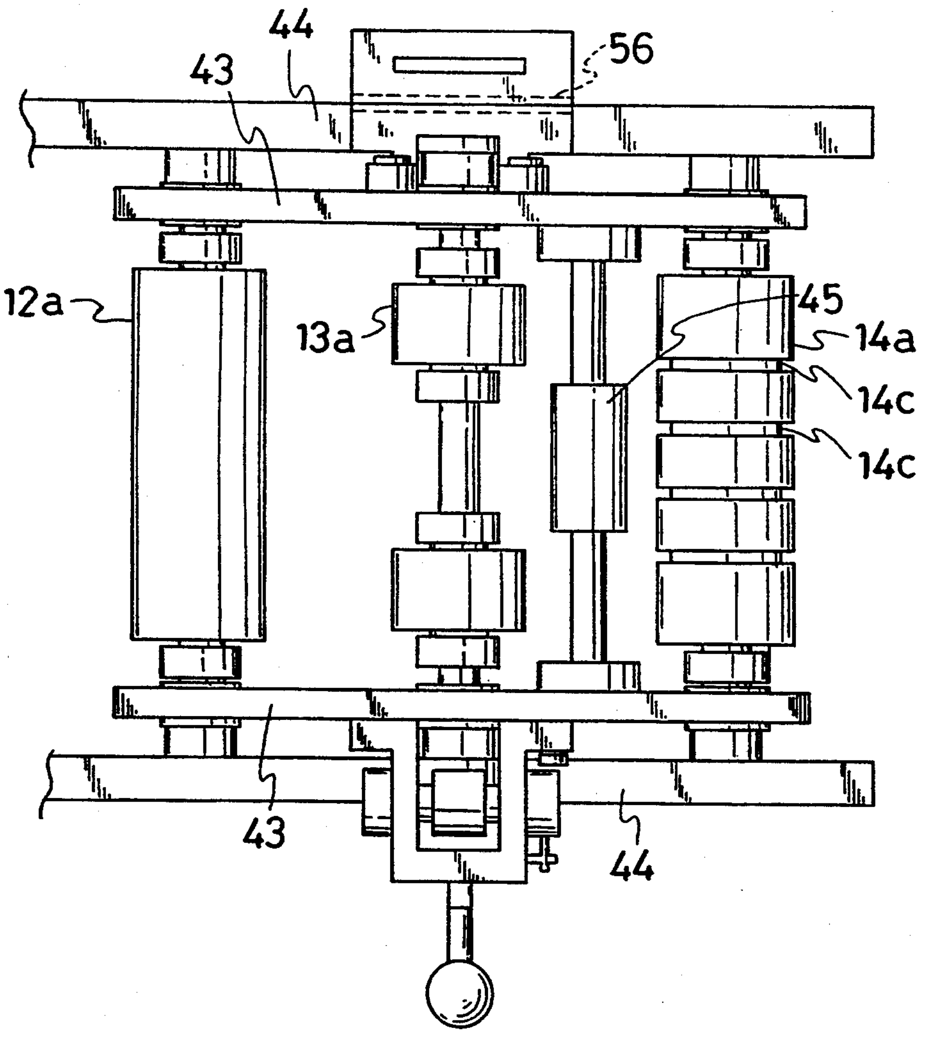
Figure 7C:
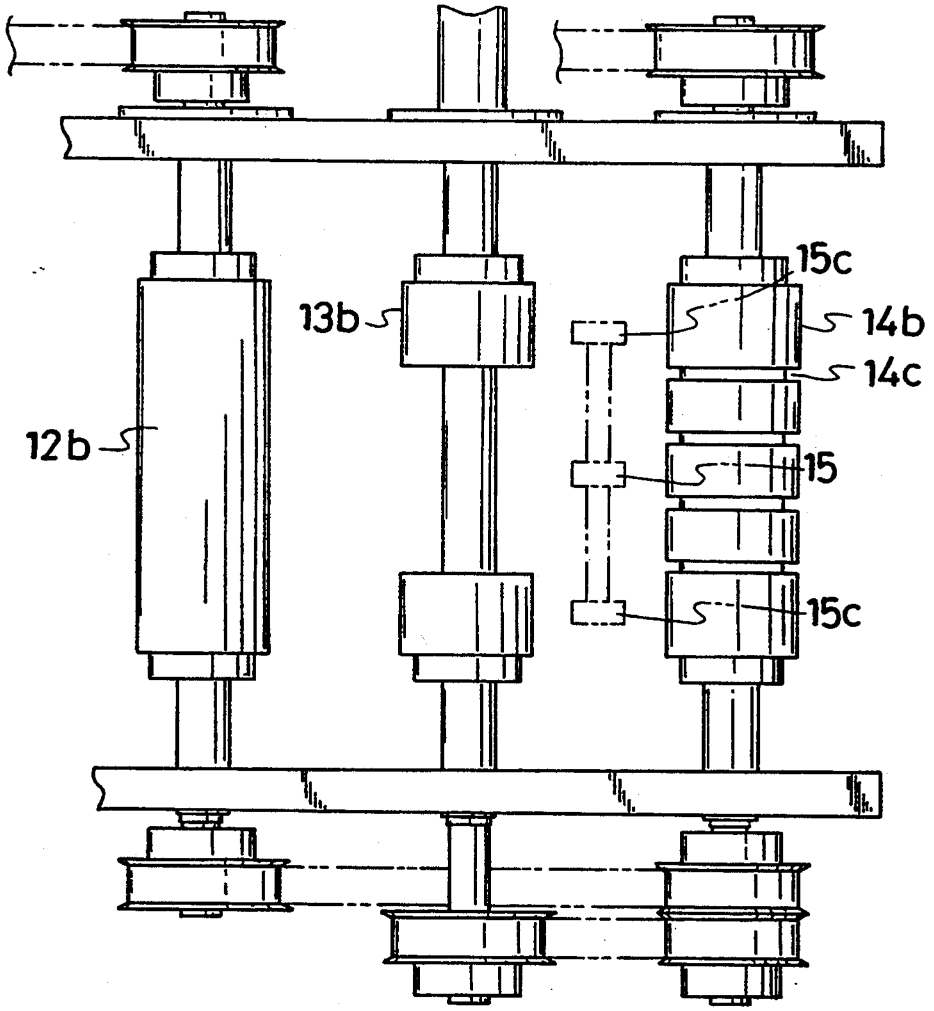
Figure 7D:
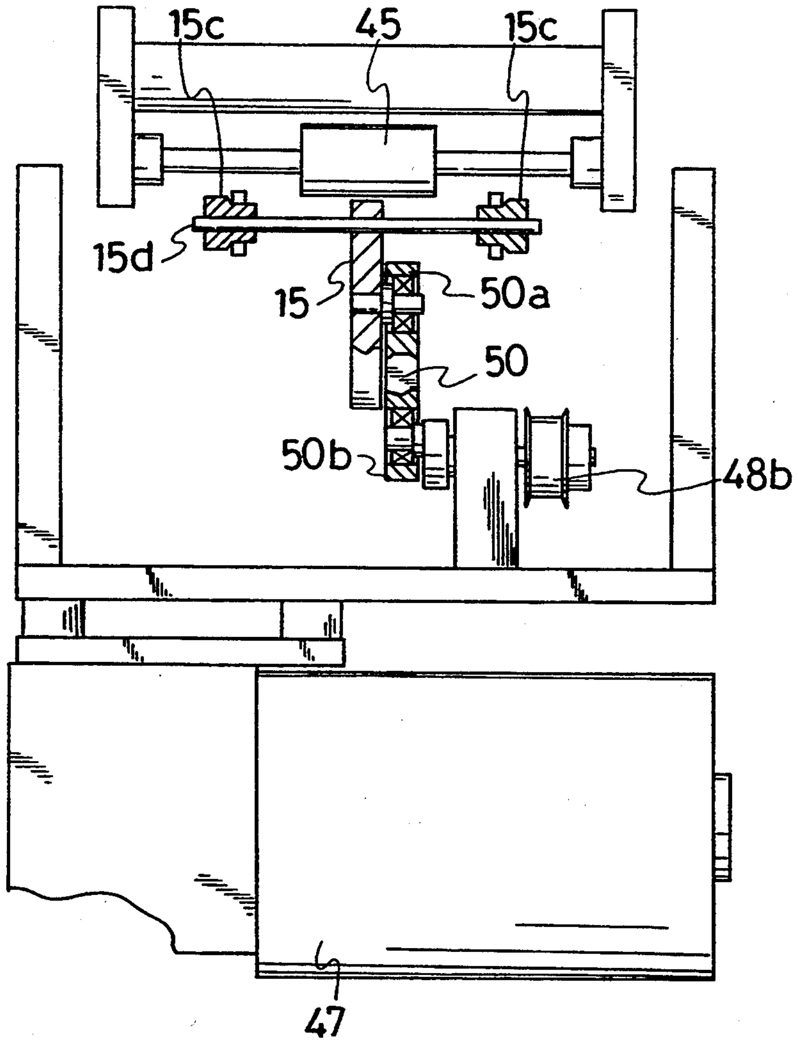
Figure 7E:
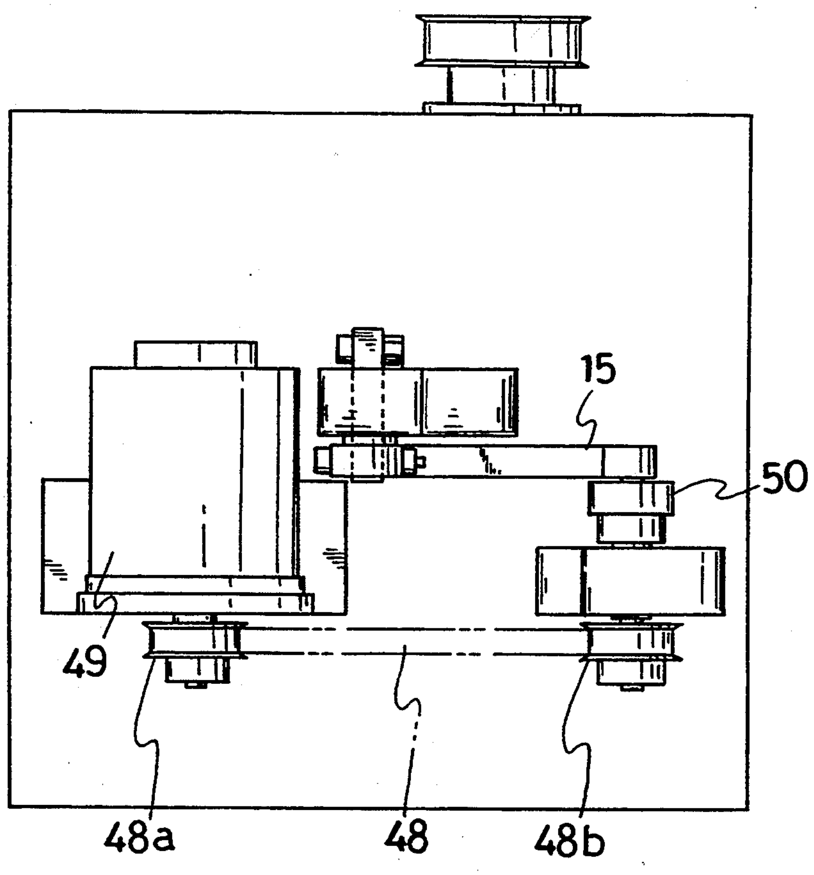
Figure 7F:
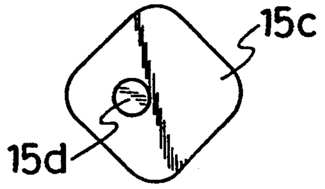

In FIG. 6, reference numeral 10 denotes upper and lower press rolls provided for bonding the continuous sheet 2 heated by the heating device to the films 6, 7 by heating them, in which each roll are placed above and below the continuous sheet 2, being respectively provided in pairs.

The arrangement of the separating device 11 is described below with reference to FIG. 7.

In FIG. 7, reference numerals 12*a*, 12*b* denote upper and lower first rollers; reference numerals 13*a*, 13*b*, upper and lower second rollers; and reference numeral 14*a*, 14*b*, upper and lower third rollers, the three types of rollers being respectively provided in pairs. The three upper rollers 12*a*, 13*a*, 14*a* are supported by right and left support plates 43, and the three lower rollers 12*b*, 13*b*, 14*b* are supported by right and left support plates 44. The support plates 43 for supporting the upper rollers 12*a*, 13*a*, 14*a* are rotated with respect to the support plates 44 for supporting the lower rollers 12*b*, 13*b*, 14*b* so that the upper rollers 12*a*, 13*a*, 14*a* being in contact with the lower rollers 12*b*, 13*b*, respectively, in a normal state can be rotated around a shaft 56 with respect to the lower rollers 12*b*, 13*b*, 14*b*. Each of the upper and lower third rollers 14*a*, 14*b* has a plurality of slits formed thereon.

Reference numeral 15 denotes a vibration rod which is provided with two shock blocks 15*c* at both sides thereof for hitting the film-containing continuous sheet 2*d* and which has both ends 15*a*, 15*b*, and the one end 15*b* is moved upward and downward around the other end 15*a* serving as a center.

Reference numeral 45 denotes a retainer provided above the center of the shock blocks 15*c* and the vibration rod 15 opposite to these members so as to hold the upper side of the film-containing continuous sheet 2*d* when the sheet 2*d* is hit by the shock blocks 15*c*.

As shown in FIGS. 7(*d*) and 7(*f*), the shock blocks 15*c* are eccentrically provided on a shaft 15*d*.

Reference numeral 46 denotes a belt wound around the lower third roller 14*b* and a motor for driving the third roller 14*b*.

Reference numeral 48 denotes a belt wound around a pulley 48*b* and a pulley 48*a* which is coaxially provided on a motor 49 for driving the vibration rod 15. Reference numeral 50 denotes a connecting plate provided at one end 50*a* on the vibration rod 15, the other end 50*b* being eccentrically rotatably provided on the pulley 48*b*.

An embodiment of the method of producing postcards by using the above-mentioned postcard producing apparatus is described below.

Figure 8:
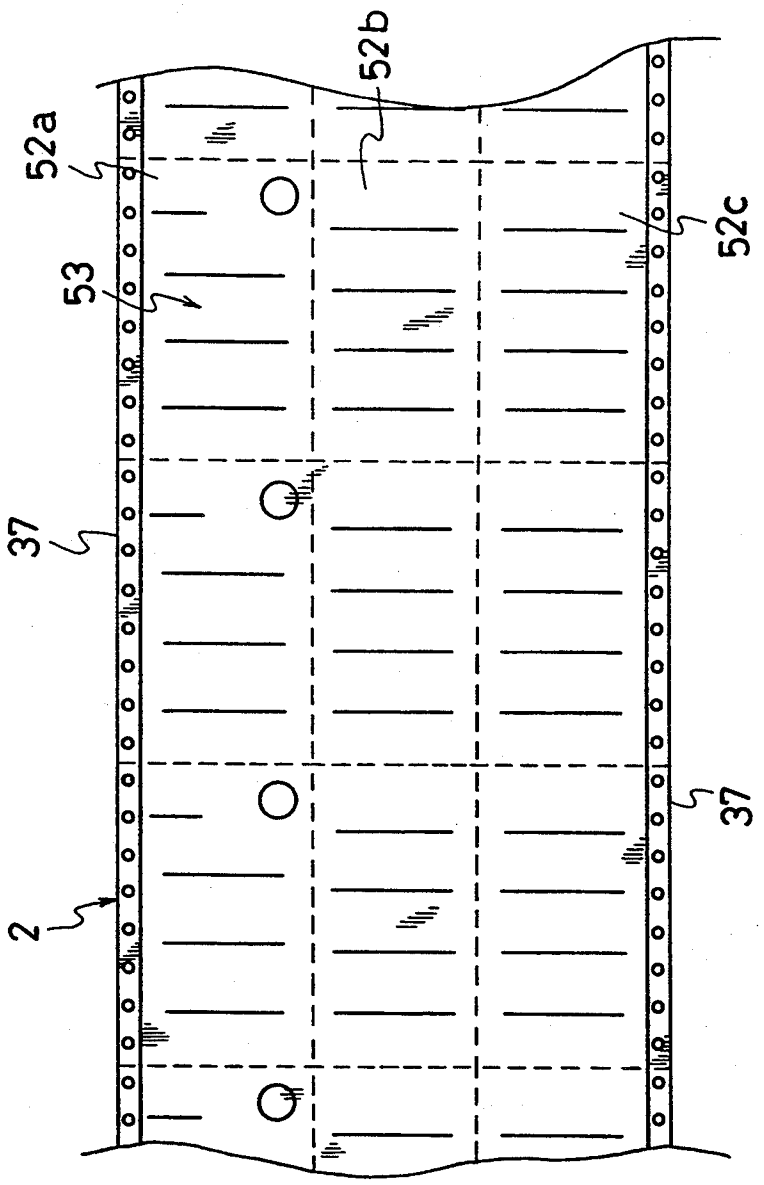
FIG. 8 is a schematic plan view of a continuous sheet before being folded.

The continuous sheet 2 comprising a plurality of postcard-forming sheets 53 each of which has sheet portions 52*a*, 52*b*, 52*c* and which are connected in series, as shown in FIG. 8, is folded into three by the folding device 1 shown in FIG. 2.

Figure 9:
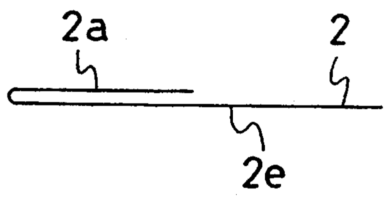
FIG. 9 is a schematic explanatory view showing the state where a continuous sheet is folded into two by a folding device.
Figure 10:
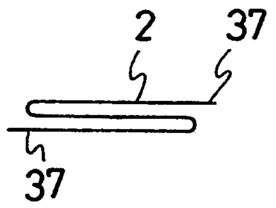
FIG. 10 is a schematic explanatory view showing the state where a continuous sheet is folded into three by a folding device.

This process is described in detail below. After the folding of the continuous sheet 2 which is passed through the conveying roll 19 and the bottom roll 20 has been started by the folding starting rods 21, the continuous sheet 2 is folded into two by the double folding rod 22 so that the width of one leaf 2*e* of the continuous sheet 2 is about twice the width of the other leaf 2*a*, as shown in FIG. 9. The continuous sheet 2 folded in two is then conveyed to the treble folding rods 24 through the upper roll 23 and folded by the treble folding rods 24 to form three sheet portions 2*a*, 2*b*, 2*c*, as shown in FIG. 10.

The continuous sheet 2 folded in three is then transferred to the next process through the direction changing roll 25.

As described above, since the continuous sheet 2 is folded while being conveyed and guided by a plurality of rods and rolls, the continuous sheet 2 is not subjected to concentrated tension. It is also an important point that during the folding operation, since the continuous sheet 2 is first folded in two by the double folding rod 22 so that the width of one sheet leaf 2*e* of the continuous sheet 2 is about twice the width of the other sheet leaf 2*a*, and the other sheet leaf 2*c* of the continuous sheet 2 is folded in the reverse direction to form the sheet 2 folded in three, no stress along a curved surface occurs, but only stress along the sheet surface mainly occurs during double folding and treble folding. It is therefore possible to effectively relieve the tension applied to the continuous sheet 2, without carelessly separating the continuous sheet 2 at a position of perforations.

The continuous sheet 2 folded in three as described above is then sent to the process of inserting the two films 6, 7 by using the film inserting device 3.

Figure 11:
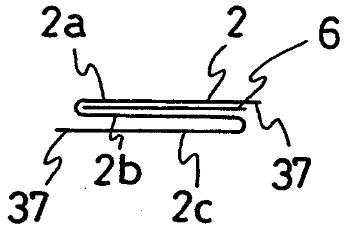
FIG. 11 is a schematic explanatory view showing the state where a film is inserted into two portions of a continuous sheet by a film inserting device.
Figure 12:
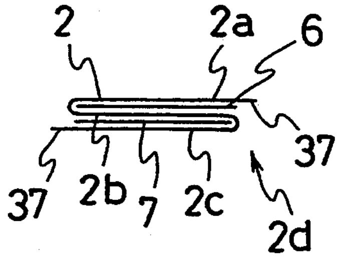
FIG. 12 is a schematic explanatory view showing the state where films are inserted into three portions of a continuous sheet by a film inserting device.

This process is described in detail below. The continuous sheet 2 transferred from the folding device 1 is moved straight by the guide roller 30. The film 6 conveyed from one roll 28 is first inserted between the first and second sheet portions *2a* and *2b* of the continuous sheet 2 through the guide means 4, as shown in FIG. 11. The other film 7 conveyed from the other roll 29 is then inserted between the second and third sheet portions *2b* and *2c* of the continuous sheet 2 through the guide means 5, as shown in FIG. 2. Each of the films 6, 7 is changed in its moving direction at about 90° by a triangular guide plate (not shown) when being inserted between the respective sheet portions of the continuous sheet 2, as shown in FIG. 3(*b*).

After the films have been inserted as described above, the edge cutting work is performed by the edge cutting device 8.

This process is described in detail below. The third rollers 33 are first driven by driving a motor (not shown). When the third rollers 33 are driven, the third rollers 33 are rotated, accompanied by the rotation of the first roller 31. The rotation of the first roller 31 causes the rotation of the second roller 32 and the edge cutting rollers 34, on both of which the belt 35 is wound.

When all the rollers are rotated, the edge cutting device 8 is operated.

In the state where the edge cutting device 8 is operated, the edges 37 of the film-containing continuous sheet *2d* which is conveyed after the films are inserted therein by the film inserting device 3 are respectively downwardly pressed while being held by the first roller 31, the third rollers 33, the round belts 35 and the edge cutting rollers 34, whereby the edges 37 are cut.

In this case, since the round belts 35 are respectively inserted into the grooves 36 of the edge cutting rollers 34, the round belts 35 are not deviated from the edge cutting rollers 34 regardless of the pressure of the edges 37 acting on the round belts 35.

After the edges 37 have been cut, heating is performed by the heating device 9.

This process is described in detail below. When the film-containing continuous sheet *2d* is passed between the upper heater 38 and the lower heater 39 in the heating device 9, the sheet *2d* is heated by the heat generated from the upper and lower heaters 38, 39.

When a wrong operation or overheating occurs, the upper heater 38 is separated from the lower heater 39 so that the heating work is stopped. Namely, if the air cylinders 41, 42 are operated, the upper heater 38 is upwardly moved through the rod *41a* in the direction of arrow A in FIG. 5, and the lower heater 39 is downwardly moved through the rod *42a* in the direction of arrow B so that the upper and lower heaters 38, 39 are separated from the film-containing continuous sheet *2d*. This can rapidly prevent the characters or the like printed on the continuous sheet from being burnt.

After the film-containing continuous sheet *2d* has been heated, the continuous sheet *2d* is bonded to the films 6, 7 by the press rollers 10.

Namely, as shown in FIG. 6, when the film-containing continuous sheet *2d* is passed between the press rollers 10, the continuous sheet 2 is securely bonded to the films 6, 7 by virtue of the pressure of the press rollers 10 and the remaining heat generated by the heating device 9.

The film-containing continuous sheet *2d* which is heated and bonded as described above is then separated in each predetermined size of postcard.

Figure 14:
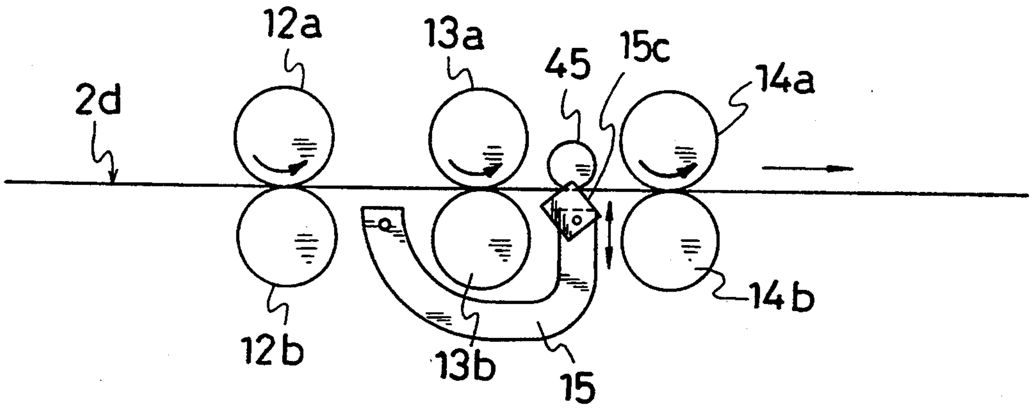
FIGS. 14(*a*) and 14(*b*) are a schematic front view and a schematic side view, respectively, showing the state where a continuous sheet is hit.
Figure 14:
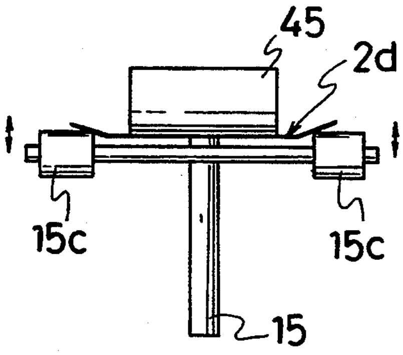
Figure 15A:
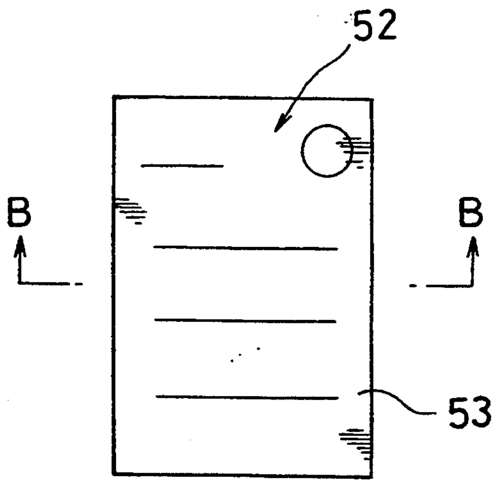
FIG. 15(*a*) is a front view of a postcard product, and FIG. 15(*b*) is an enlarged sectional view taken along the line B—B in FIG. 15(*a*)
Figure 15B:
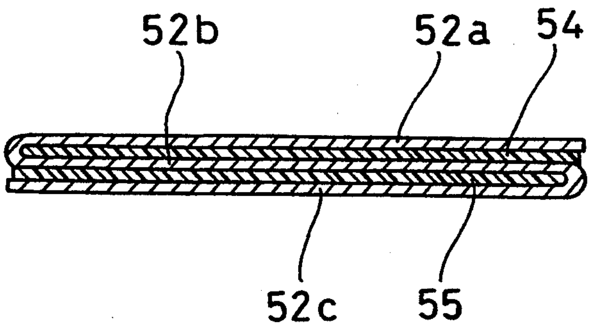
Figure 16:
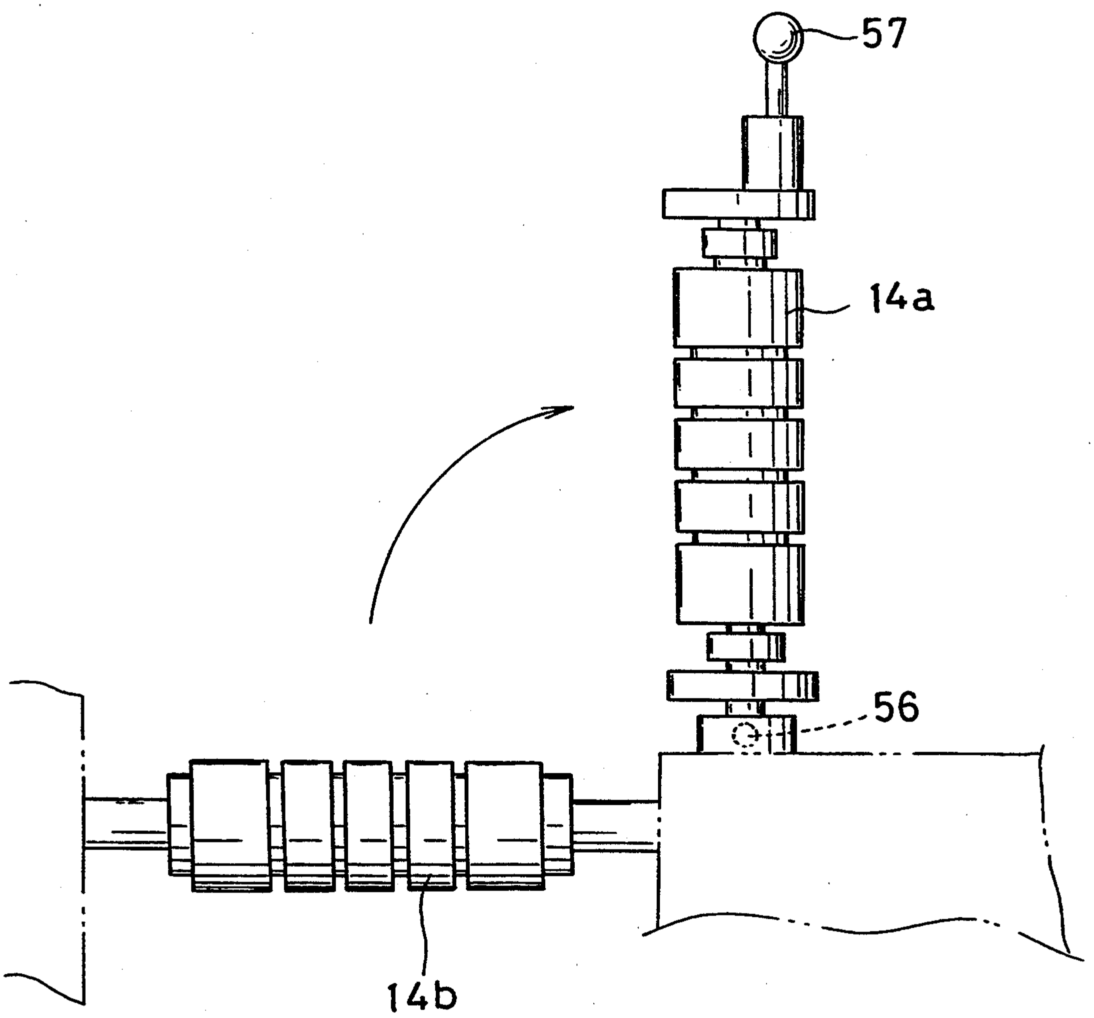
FIG. 16 is a schematic side view showing a separating device in an open state.

This process is described in detail below. When the film-containing continuous sheet *2d* is passed between the first rollers *12a, 12b*, the second rollers *13a, 13b* and the third rollers *14a, 14b*, as shown in FIG. 14, the both edges of the sheet *2d* are hit by the shock blocks *15c* provided on the vibration rod 15, while the sheet *2d* being horizontally held by the retainer 45.

Figure 13:
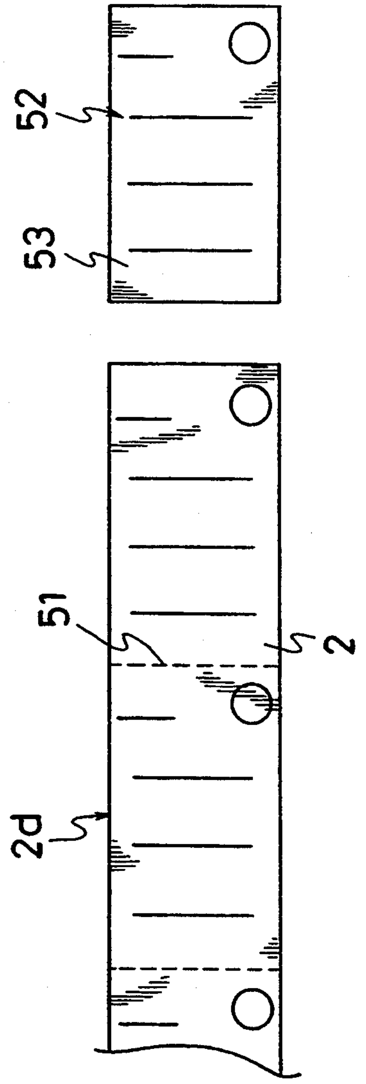
FIG. 13 is a schematic plan view showing the state where a continuous sheet is separated.

In this case, the film-containing continuous sheet *2d* is easily smoothly separated at each position of perforations 51 by virtue of the tensile force generated among the first rollers *12a, 12b*, the second rollers *13a, 13b* and the third rollers *14a, 14b* corresponding to the transfer speeds thereof, as shown in FIG. 13, to produce postcards 52 each having a standard size.

A detailed description will now be given of the mechanism for hitting the continuous sheet *2d* by the shock blocks *15c* while holding it by the retainer 45 with reference to FIG. 7(*a*). When the belt 48 is rotated by driving the motor 49 through the rotation of the pulley *48a*, the pulley *48b* is rotated. The rotation of the pulley *48b* vertically moves the connecting plate 50 having an end *50b* eccentrically connected to the pulley *48b*. The vertical movement of the connecting plate 50 vertically moves the vibration rod 15 so that both edges of the film-containing sheet *2d* are hit by the shock block *15c* provided at both sides of the vibration rod 15 while being held by the retainer This hitting action is described in detail below. The film-containing continuous sheet *2d* is hit by the shock blocks provided on the vibration rod 15, while being held within a predetermined central region thereof by the upper retainer 45, as shown in FIG. 14(*b*). The film-containing continuous sheet *2d* is thus torn at the portion of perforations 51 from the both ends thereof to the center so that the film-containing sheet *2d* can be smoothly separated.

In this case, the interference amount of the vertical movement of the shock blocks *15c* can be adjusted by adjusting the distance between the retainer 45 and the shock blocks *15c*. In addition, since each of the shock blocks *15c* is eccentrically provided on the shaft *15d*, as shown in FIG. 7(*f*), the interference amount can also be adjusted by replacing the shock blocks *15c* provided on the shaft *15d* by other blocks. The terms "interference amount" represents the distance between the lower end of the retainer 45 and the upper end of each of the shock blocks *15c* when the lower end of the retainer 45 is placed below the upper end of each of the shock blocks *15c*. The interference amount is preferably adjusted so that the holding function of the retainer 45 and the hitting function of the shock blocks *15c* are made effective.

In addition, since the third roll *14b* has a plurality of slits *14c* formed thereon, the stress applied to the film-containing continuous sheet *2d* can be concentrated in the lengthwise direction thereof.

There is also the advantage that the tensile force is concentrated in the portions at both sides of the film-containing continuous sheet *2d* by the second rolls *13a, 13b* so that the shock effect of the shock blocks *15c* can be further improved.

There is a further advantage that the number of contacts between the film-containing continuous sheet 2*d* and the shock blocks 15*c* can be changed by changing the speed of the motor 47 in correspondence with the transfer velocity of the film-containing continuous sheet 2*d*, the difficulty in tearing the film material or the like, whereby the hitting force can be adjusted.

A description will now be made of an opening mechanism operated when a wrong operation occurs in the above-mentioned postcard producing apparatus.

When a trouble in the separating device 11, rolling-in of the continuous sheet or the like occurs, the support plates 43 for supporting the upper rollers 12*a*, 13*a*, 14*a* is rotated, by using a lever 57, around the shaft 56 with respect to the support plates 44 for supporting the lower rollers 12*b*, 13*b*, 14*b* to create the open state shown in the drawings. In this state, the upper rollers 12*a*, 13*a*, 14*a* are separated from the lower rollers 12*b*, 13*b*, 14*b*, and the state where the film-containing continuous sheet 2*d* is held by the rollers is thus released. It is thus possible to discharge the film-containing continuous sheet 2*d* without damaging the sheet 2*d* and reproduce this portion. In addition, the film-containing continuous sheet 2*d* can be extracted with good workability, and the operation after the reproduction can be smoothly performed.

Figure 17:
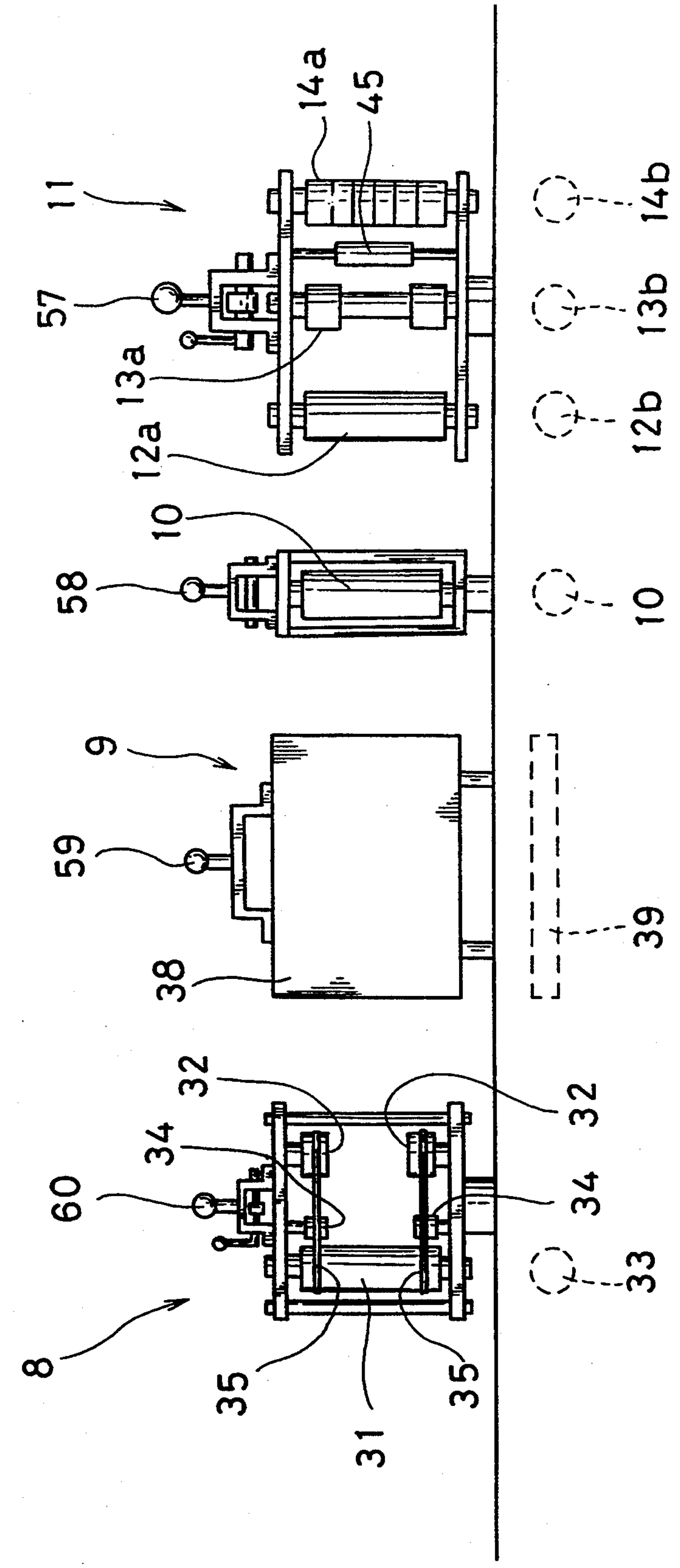
FIG. 17 is a schematic front view showing a separating device, press rollers, a heating device and an edge cutting device in an open state.

As shown in FIG. 17, the upper press roller 10 is rotated relative to the lower press roller 10 by using a lever 58 to produce an open state in the same way as in the separating device 11 in which each of the upper rollers is put into an open state. Similarly, the upper heater 38 in the heating device 9 is rotated with respect to the lower heater 39 by using a lever 59 to create an open state, and the first roller 31, the second rollers 32, and the edge cutting rollers 32 are rotated with respect to the third roller 33 by using a lever 60 to produce an open state.

In this way, the upper portion is put into an open state with respect the lower portion in each of the separating device 11, the press roller 10, the heating device 9 and the edge cutting device 8 so that the film-containing continuous sheet 2*d* can be smoothly easily discharged even if a trouble occurs in any place.

When such a trouble occurs, the transfer of the film-containing continuous sheet 2*d* is automatically stopped.

After the continuous sheet 2 has been separated into the postcards 52 each having a standard size, as described above, the postcards 52 produced are successively piled on the discharge conveyor 16 and then forwardly slowly moved. In this case, the conveying velocity of the discharge conveyor 16 can be freely adjusted, whereby the piling amount can be adjusted.

The postcards each of which is folded in three and has the films 6, 7 inserted therein are continuously automatically produced by the above-described method.

Although the above embodiment concerns the case in which postcards folded in three are produced, the postcards produced need not to be folded in three, for example, the postcards may be folded in two. In a word, the postcards may be folded in at least two.

The folding device 1 for postcards is also not limited to the structure above described in the embodiment, and the folding device may have any structure suitable for folding in two.

The structure of the film inserting device 3 is not limited to the structure provided with the guide means 4, 5 in the above embodiment, and the design can be changed arbitrarily.

In the above embodiment, since the edge cutting device 8 comprises the round belts 35 and the edge cutting rollers 34 so that the edges 37 can be cut by the pressure of both members, the embodiment has the preferable effect of easily cutting the edges 37. However, the structure of the edge cutting device 8 is not limited to that in the embodiment.

Although the above embodiment uses the selvaged continuous sheet 2 which is generally used in computers, a continuous sheet 2 without edges can be used. Thus the edge cutting device 8 is dispensable in the invention.

The structure of the heating device 9 is not limited to that in the embodiment, and the structure in which the upper heater 38 and the lower heater 39 can be separated by the function of the air cylinders 49, 42, as in the above embodiment, is also dispensable in the invention.

Further, although the press rollers 10 are independently provided in the embodiment, for example, the first roller 12 of the separating device 11 may also be used as the press rollers 10. The press device is not limited to the rollers in the embodiment, and any device can be employed so far as it is capable of pressing the film-containing continuous sheet 2*d* after heating.

The structure of the separating device is not limited to that in the above embodiment, and any device having a structure which allows the sheet to be separated by the tensile force of at least two rollers which transfer the sheet at different speeds and a hitting mechanism can be used.

Further, although the above embodiment has the preferable effect that the hitting force can be changed by changing the rotational speed of the motor 49 because the hitting mechanism is a link mechanism comprising the connecting plate 50, the vibration rod 15 and so on, such a link mechanism is a dispensable condition in the invention, and any hitting mechanism can be employed.

In the above embodiment, since each of the shock blocks 15*c* has a substantially square form, as shown in FIG. 7(*b*), the embodiment has the preferable effect that the separating effect can be further improved by attaching each of the shock blocks 15*c* in such a manner that the corner portion thereof contacts with the film-containing continuous sheet 2*d*. However, the shape of the each of the shock blocks 15*c* is not limited to the substantially square form, and, for example, the shock blocks may be formed into a roll.

Further, although the films 6, 7 are inserted after the continuous film 2 has been folded in the production method according to the embodiment, these operations may be simultaneously performed, regardless of the procedures thereof.

In addition, although the embodiment concerns the case where postcards are produced, the present invention can be applied to the postcards as well as envelopes. The present invention can be applied to any communicatin articles such as postcards, envelopes and the like.

As described above, in the present invention, since communication articles such as postcards, envelopes or the like are produced through a series of processes of folding, inserting films, heating, bonding by press and separating, the whole process of producing communicatin articles with films can be continuously automatically performed, and an attepmt can be made to perform the mass production of communication articles with films.

In addition, the continuous sheet is not separated by simply employing only the tensile force caused by the speed difference between two rolls, as conventional apparatus, but the continuous sheet is separated by employing the tensile force and hitting the perforations at the bondaries between respective communication article-forming portions. The invention thus has the effect of easily, smoothly, securely separating the sheet into respective communicatin article-foring portions regardless of the interposition of the films in the continuous sheet.

Further, since the film-containing continuous sheet is easily and securely separated into respective communication article-forming portions by hitting, no distortion occurs at the edges of the films separated, as in conventional apparatuses. The invention thus has the effect of preventing the films from extruding from the edges of the communication articles produced and thus preferably preventing the occurence of defective products.

In addition, since a film is not inserted between separate two sheets, as in conventional apparatuses, but a film is inserted between the sheet portions produced by folding the continuous sheet in at least two, the film can securely inserted between the sheet portions of the continuous sheet folded, without producing any positional deviation. The invention thus has no danger of producing a postional deviation between the continuous sheet and the films and the advantage of more preferably preventing the occurrence of defective products.

Many different embodiments of the present invention may be constructed without departing from the spirit and scope of the present invention. It should be understood that the present invention is not limited to the specific embodiments described in this specification, and is only limited in the appended claims.

What is claimed is:

1. An apparatus for producing communication articles including postcards and envelopes in which a communication article-forming sheet used for forming communication articles including postcards and envelopes is formed so that said sheet can be folded in at least two, a synthetic resin film is inserted between folded sheet portions of said communication article-forming sheet, and said folded sheet portions with said film therebetween are separably bonded, said apparatus comprising:

a folding device for folding, in at least two, a continuous sheet having a plurality of said communication article-forming sheets which are connected in series, while conveying said continuous sheet;

a film inserting device for inserting a continuous film between the sheet portions into which said continuous sheet is folded to form a film-containing continuous sheet;

a heating device for heating said film-containing continuous sheet in which said film is inserted by said film inserting device;

a press device for pressing said film-containing continuous sheet heated by said heating device so as to bond said sheet portions of said continuous sheet with said film therebetween; and a separating device for separating said continuous sheet into said communication article-forming sheets to produce communication articles, wherein said separating device includes, at least two rollers which are spaced apart from each other for transferring the film-containing continuous sheet in which said continuous film is inserted at different transfer speeds, while holding said continuous sheet therebetween, at least one shock block disposed between said two rollers for vertically hitting said film-containing continuous sheet and tearing said film containing continuous sheet at perforations thereof from both ends to a center thereof, and a retainer for holding the side of said film-containing continuous sheet opposite to and between said shock blocks when said film-containing continuous sheet is hit by said shock blocks.

2. The apparatus for producing communication articles according to claim 1, wherein said shock block is provided at a side of a vibration rod which is vertically moved by the vertical movement of a connecting plate eccentrically rotatably supported by a pulley positioned apart from the other pulley coaxially provided on a motor, said connecting plate being vertically moved by the rotation of a belt wound around said two pulleys, the vertical movement being performed by driving said motor.

3. The apparatus for producing communication articles according to claim 1, wherein a tensile force is concentrated at both sides of the film-containing continuous sheet by said at least two rollers.

* * * * *